US005506923A

United States Patent [19]
Goettsche et al.

[11] Patent Number: 5,506,923
[45] Date of Patent: Apr. 9, 1996

[54] APPARATUS AND METHOD FOR TRIMMING OF FIBER OPTIC WINDING

[75] Inventors: Randy P. Goettsche; Ralph A. Bergh, both of Phoenix, Ariz.

[73] Assignee: Honeywell Inc., Minneapolis, Minn.

[21] Appl. No.: 231,882

[22] Filed: Apr. 22, 1994

Related U.S. Application Data

[63] Continuation of Ser. No. 917,866, Jul. 21, 1992, abandoned, and a continuation-in-part of Ser. No. 797,342, Nov. 25, 1991, abandoned.

[51] Int. Cl.$^6$ ............................. G02B 6/04; B65H 18/28; G01B 9/02
[52] U.S. Cl. .......................... 385/115; 385/12; 385/123; 385/147; 242/159; 242/174; 242/176; 242/166; 356/350
[58] Field of Search .............................. 385/12, 115, 123, 385/126, 127, 128, 134, 136, 137, 147; 242/159, 174, 176, 166; 356/350; 250/227.14

[56] References Cited

U.S. PATENT DOCUMENTS

| | | | |
|---|---|---|---|
| 4,291,989 | 9/1981 | Altares | 356/350 |
| 4,545,682 | 10/1985 | Greenwood | 356/350 |
| 4,588,296 | 5/1986 | Cahill | 356/350 |
| 4,591,269 | 5/1986 | Mohr | 356/350 |
| 4,699,451 | 10/1987 | Mohr | 385/115 X |
| 4,702,599 | 10/1987 | Mohr | 356/350 |
| 4,724,316 | 2/1988 | Morton | 385/128 |
| 4,743,115 | 5/1988 | Arditty et al. | 356/350 |
| 4,781,461 | 11/1988 | Baron et al. | 356/350 |
| 4,793,708 | 12/1988 | Bednarz | 356/350 |
| 4,842,409 | 6/1989 | Arditty | 356/350 |
| 4,856,900 | 8/1989 | Ivancevic | 356/350 |
| 4,873,030 | 10/1989 | Taketani et al. | 356/123 |
| 4,950,049 | 8/1990 | Darsey et al. | 385/123 X |
| 4,955,688 | 9/1990 | Chapin et al. | 385/123 X |
| 4,959,344 | 9/1990 | Chesler et al. | 242/177 X |
| 5,168,539 | 12/1992 | Negishe et al. | 385/147 |
| 5,182,785 | 1/1993 | Savegh | 356/128 |
| 5,187,757 | 2/1993 | Ohms | 356/350 |

FOREIGN PATENT DOCUMENTS

| | | | |
|---|---|---|---|
| 0207844 | 1/1987 | European Pat. Off. | 385/115 X |
| 0292103 | 11/1988 | European Pat. Off. | 385/115 X |
| 3533687 | 3/1987 | Germany | 356/350 |
| 2146428 | 4/1985 | United Kingdom | 385/115 X |
| 9311406 | 6/1993 | WIPO | 385/115 X |

OTHER PUBLICATIONS

*Patent Abstracts of Japan, vol. 012, No. 240, p. 727, 8 Jul. 1988 Toshiba (Japanese Pat. Appl. No. 63-33612).

Primary Examiner—Brian Healy
Attorney, Agent, or Firm—Marshall, O'Toole, Gerstein, Murray & Borun

[57] ABSTRACT

In a optical fiber coil arrangement for use in rotation sensors, for example, axial and/or radial errors can be reduced or substantially eliminated by employing trimming lengths of the first and second ends of the optical fiber used to wind the coil. The first and second ends are spatially separated from one another so as to reduce such errors. The trimming lengths may be in the form of trimming turns. To eliminate axial errors, the first end is formed into a first number of trimming turns and the second end is formed into a second number of trimming turns so that the first and second number of trimming turns are spatially offset from each other in an axial direction. To eliminate radial errors, the first end is formed into a first number of trimming turns and the second end is formed into a second number of trimming turns so that the first and second number of trimming turns are spatially offset from each other in a radial direction. Radial and axial compensation may be combined.

24 Claims, 8 Drawing Sheets

| LAYER L | (2i−m−1) | RELATIVE Ṫ FACTOR | LAYER ERROR | QUAD ERROR | OCT ERROR |
|---|---|---|---|---|---|
| 1  | −15 | 0 | 0   |     |     |
| 16 | 15  | 1 | 15  | +28 |     |
| 15 | 13  | 1 | 13  |     |     |
| 2  | −13 | 0 | 0   |     |     |
|    |     |   |     |     | +8  |
| 14 | 11  | 0 | 0   |     |     |
| 3  | −11 | 1 | −11 | −20 |     |
| 4  | −9  | 1 | −9  |     |     |
| 13 | 9   | 0 | 0   |     |     |
| 12 | 7   | 0 | 0   |     |     |
| 5  | −7  | 1 | −7  | −12 |     |
| 6  | −5  | 1 | −5  |     |     |
| 11 | 5   | 0 | 0   |     |     |
|    |     |   |     |     | −8  |
| 7  | −3  | 0 | 0   |     |     |
| 10 | 3   | 1 | 3   | +4  |     |
| 9  | 1   | 1 | 1   |     |     |
| 8  | −1  | 0 | −1  |     |     |

Ṫ₁   Ṫ₂

$\Delta \dot{T} = \dot{T}_2 - \dot{T}_1$ $\Omega e = 0$

Fig.6

| LAYER L | (2i-m-1) | RELATIVE İ FACTOR | LAYER ERROR | QUAD ERROR | OCT ERROR |
|---|---|---|---|---|---|
| 1  | -15 | 1  | -15 |    |    |
| 16 | 15  | 2  | 30  | +2 |    |
| 15 | 13  | 3  | 39  |    |    |
| 2  | -13 | 4  | -52 |    |    |
|    |     |    |     |    | 0  |
| 14 | 11  | 5  | 55  |    |    |
| 3  | -11 | 6  | -66 | -2 |    |
| 4  | -9  | 7  | -63 |    |    |
| 13 | 9   | 8  | 72  |    |    |
|    |     |    |     |    |    |
| 12 | 7   | 9  | 63  |    |    |
| 5  | -7  | 10 | -70 | -2 |    |
| 6  | -5  | 11 | -55 |    |    |
| 11 | 5   | 12 | 60  |    |    |
|    |     |    |     |    | 0  |
| 7  | -3  | 13 | -39 |    |    |
| 10 | 3   | 14 | 42  | +2 |    |
| 9  | 1   | 15 | 15  |    |    |
| 8  | -1  | 16 | -16 |    |    |

APPARATUS AND METHOD FOR TRIMMING OF FIBER OPTIC WINDING

This is a continuation of U.S. application Ser. No. 07/917,866, filed Jul. 21, 1992, now abandoned, and a continuation-in-part of U.S. application Ser. No. 07/797,342, filed Nov. 25, 1991, now abandoned.

FIELD OF THE INVENTION

The present invention relates to fiber optic coils and, more particularly, to fiber optic coils used in rotation sensors.

BACKGROUND OF THE INVENTION

The government has rights in this invention pursuant to Contract No. N66001-90-C-0162 awarded by DARPA.

This invention relates to a rotation sensor used for an advanced global positioning and inertial guidance system.

Optical rotation sensing devices include ring laser gyros, fiber optic rotation sensors, and the like. The fiber optic rotation sensor ordinarily comprises an interferometer which includes a light source, a beam splitter, a detector, and a light path which is mounted on a rotatable platform. Light from the light source is split by the beam splitter into two beams which are directed to opposite ends of the optical path and which then counterpropagate around that path. As the light beams exit the light path, they are recombined and the resulting combined light beam is sensed by a detector. A sensing circuit connected to the detector determines any phase difference between the counterpropagating light beams.

Assuming that this fiber optic rotation sensor experiences no rotation, ideally no difference in phase between the counterpropagating light beams will be detected. On the other hand, if the sensor experiences rotation, there will be a phase difference between the counterpropagating light beams which can be detected to indicate the extent and direction of rotation.

In a fiber optic rotation sensor, an optical fiber is coiled, usually in multiple layers, around a spool, with each layer containing multiple turns. Currently, such coils are typically wound as quadrupoles. In order to form a quadrupole coil, each half of a continuous optical fiber is first wound onto respective intermediate spools. The first spool is then used to wind a first layer of turns in a clockwise direction around a sensor spool. This first layer is wound around the sensor spool from the first end to the second end of the sensor spool. The second spool is then used to wind a second layer of turns in a counterclockwise direction around a sensor spool. This second layer is wound around the sensor spool from the first end to the second end of the sensor spool. The fiber on the second spool is then wound back from the second end to the first end of the sensor spool to form a third layer. The first spool is then used to wind a fourth layer of turns from the second end of the spool to the first end. Thus, a portion of one half (i.e. one end) of the optical fiber is used to form the first and fourth layers of turns and a portion of the other half (i.e. the other end) is used to form the second and third layers. These four layers of turns are usually referred to as a quadrupole. If "+" and "−" are used to designate the first and second halves or ends of the optical fiber respectively, this quadrupole is wound with +−−+ layers. The quadrupole is repeated for as many layers as is desired for the optical path. Accordingly, a second quadrupole will be wound with +−−+ layers about the first quadrupole so that the resulting two quadrupole arrangement will have a +−−+ +−−+ layer configuration.

When a fiber optic coil wound in this fashion is subjected to an axial and/or radial time varying temperature gradient, there will be a phase difference between the counterpropagating light beams which results in a false indication of rotation; that is, this phase difference is an error. Causes other than axial and/or radial time varying temperature gradients can produce errors which may result in a false indication of rotation. For example, errors can result if the layers of the coil are wound inconsistently in the axial and/or radial directions and if the layers are subjected to varying environmental conditions such as a time varying temperature gradient. Thus, although the present invention is discussed in terms of errors produced by axial and/or radial time varying temperature gradients, the present invention is useful in substantially reducing errors resulting from other axial and/or radial influences as well. Consequently, errors resulting from axial and/or radial influences are referred to herein as axial and/or radial errors.

SUMMARY OF THE INVENTION

Such errors can be substantially reduced by the present invention. Accordingly, in one aspect of the invention, a fiber optic coil comprises a plurality of layers wherein each layer includes a plurality of turns wound from an optical fiber. The fiber optic coil further comprises a trimming length of at least one end of the optical fiber wherein the trimming length is arranged so that error between phases of light counterpropagating through the optical fiber is reduced.

According to another aspect of the invention, a fiber optic device is formed of a plurality of layers formed into a coil wherein each of the layers is wound from an optical fiber having first and second ends and wherein at least some of the layers form a quadrupole. The quadrupole comprises first, second, third, and fourth layers wherein the first layer is wound predominantly from a first end of the optical fiber, the second layer is wound predominantly from a second end of the optical fiber, the third layer is wound predominantly from the second end of the optical fiber, and the fourth layer is wound predominantly from the first end of the optical fiber. A first trimming length of the first end of the optical fiber and a second trimming length of the second end of the optical fiber are arranged so that error between phases of light counterpropagating through the fiber is reduced.

According to a further aspect of the invention, a method of winding a fiber optic coil comprises the following steps: winding a first layer of turns predominantly from a first end of an optical fiber; winding a second layer of turns predominantly from a second end of an optical fiber, the second layer of turns being wound around the first layer of turns; winding a third layer of turns predominantly from the second end of an optical fiber, the third layer of turns being wound around the second layer of turns; winding a fourth layer of turns predominantly from the first end of an optical fiber, the fourth layer of turns being wound around the third layer of turns; and, providing a first trimming length of the first end of the optical fiber and a second trimming length of the second end of the optical fiber wherein the first and second trimming lengths are spatially displaced from one another and are arranged so that error between phases of light counterpropagating through the fiber is reduced.

The first trimming length may be wound into a first number of trimming turns and the second trimming may be wound into a second number of trimming turns. The first and second number of trimming turns may be in proximity to the plurality of layers and may be spatially offset from each other in a axial direction with respect to the plurality of layers so as to reduce axial error. The first trimming length may be wound into a third number of trimming turns and the second trimming length may be wound into a fourth number of trimming turns. The third and fourth number of trimming turns may be in proximity to the plurality of layers and may be spatially offset from each other in a radial direction with respect to the plurality of layers so as to reduce radial error.

BRIEF DESCRIPTION OF THE DRAWINGS

These and other features and advantages will become more apparent from a detailed consideration of the invention when taken in junction with the drawings in which:

FIG. 6 is a table showing the zero net axial time varying temperature gradient dependent error of the sixteen layer reverse octupole device;

DETAILED DESCRIPTION

Figure 1:
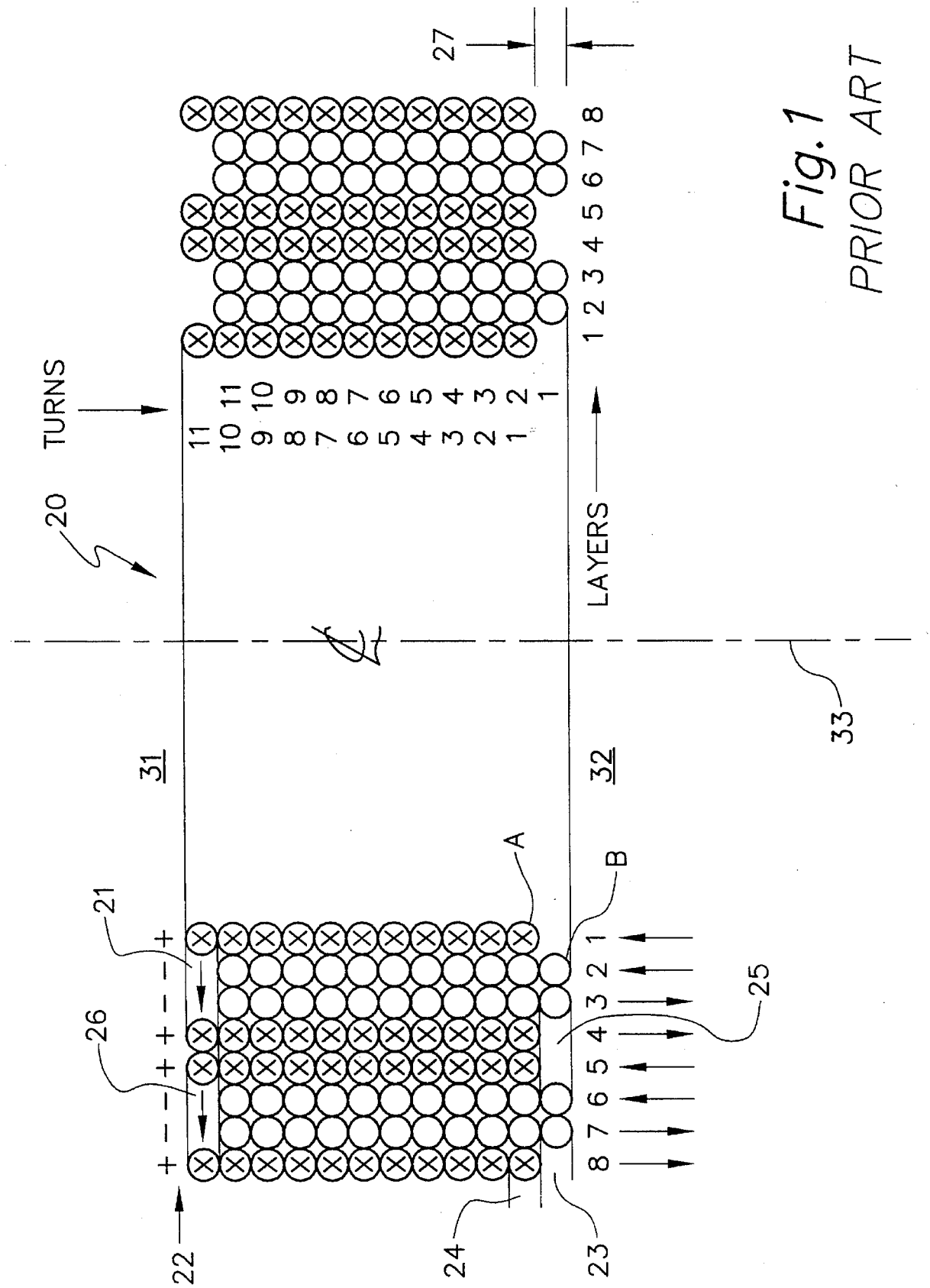
FIG. 1 shows a prior art fiber optic coil arrangement.
Figures 7, 8:
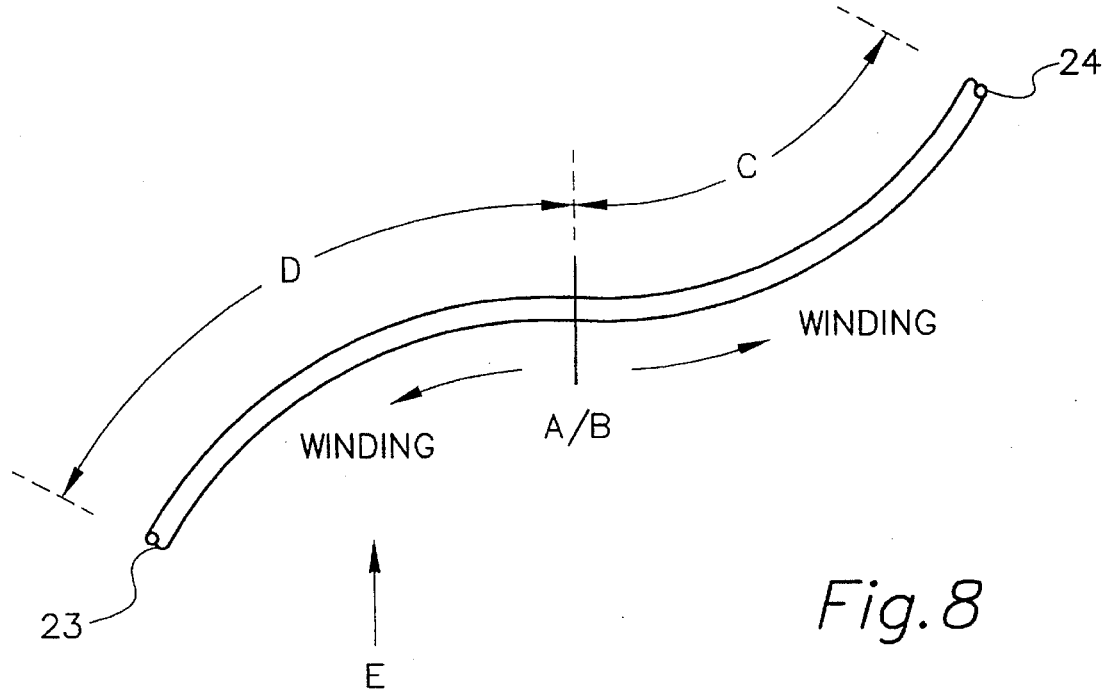
FIG. 7 is a table showing the zero net radial time varying temperature gradient dependent offset of either a reverse quadrupole or a reverse octupole device.
FIG. 8 shows an optical fiber useful in winding the coil according to the present invention.

As shown in FIG. 1, the typical quadrupole fiber optic coil 20 is wound using the ends of a continuous optical fiber, such as the optical fiber shown in FIG. 8. Accordingly, layer 1 is wound clockwise from near the middle A/B of the fiber E using first end C. Layer 1 is wound in an upward direction as viewed in FIG. 1, i.e. each turn in the layer is formed above its preceding turn. When the desired number of turns of layer 1 are wound, layer 2 is wound counterclockwise from near the middle A/B of the fiber E using second end D. Layer 2 is wound in an upward direction as viewed in FIG. 1. At end 31 of coil 20, counterclockwise winding of the second end D continues in a downward direction to wind layer 3. The first end C is bridged over to layer 4 by way of loop 21 and layer 4 is wound clockwise in the downward direction. Layer 5 is wound clockwise, using the first end C, in the upward direction. The second end D of the fiber E is bridged from layer 3 to layer 6 by way of loop 25 and layers 6 and 7 are wound counterclockwise in the directions of the arrows. The first end C of the fiber E is bridged from layer 5 to layer 8 by way of loop 26 and layer 8 is wound clockwise in the direction of the arrow from end 31 to end 32 of coil 20. As can be seen in FIG. 1, the turns with the "X" indicate the first end C of the fiber which is wound in one of the clockwise or counterclockwise directions and the turns without the "X" indicate the second end D of the fiber which is wound in the other of the clockwise or counterclockwise directions. These layers, for convenience, are indicated with "+" and "−" symbols at 22 in order to indicate which end of the fiber is used to wind the layer as well as the relative direction of winding. Layers 1–4 form a first quadrupole and layers 5–8 form a second quadrupole. As shown in FIG. 1, the two quadrupoles have the same +—−+ winding configuration.

As the arrows in FIG. 8 indicate, winding of layers 1 and 2 begins near the middle A/B of the fiber and proceeds, in the direction of the FIG. 8 arrows, from the middle A/B toward extremities 24 and 23 respectively. Extremity 23 of the second end D of the fiber is brought out of coil 20 and extremity 24 of the first end C of the fiber is also brought out of coil 20. Two light beams, which are used to counterpropagate along the path provided by the optical fiber E, are injected into respective extremities 23 and 24. One light beam, injected into extremity 23, propagates in order through layers 7, 6, 3, 2, 1, 4, 5 and 8 to exit extremity 24. The other light beam, injected into extremity 24, counterpropagates in order through layers 8, 5, 4, 1, 2, 3, 6 and 7 to exit extremity 23. The exiting light beams are recombined and are sensed by a detector so that the phases can be compared.

As can be seen from the right-hand side of FIG. 1, because of the way in which quadrupole fiber optic coils are wound, the "+" and "−" layers are offset by an axial distance 27. As a result of the winding process, this axial distance can be one fiber diameter as shown, a fraction of a fiber diameter, or several fiber diameters. Because of this axial spatial offset, if an axial time varying thermal gradient is applied to the fiber optic coil, turns of the "+" layers see a slightly different rate of temperature change than do the corresponding turns of the "−" layers. That is, turn 1 of layer 1 is offset from turn 1 of layer 2 by the amount 27, turn 2 of layer 1 is offset from turn 2 of layer 2 by the amount 27, and so on. It can be seen that, because the "−" half of the coil is spatially offset from the "+" half of the coil, there is a slightly different rate of temperature change that is experienced by the counterpropagating light beams travelling through corresponding turns of the "+" and "−" halves of the coil. (The coil halves of coil 20 are (1) all of the "+" turns which are wound in the clockwise direction and (2) all of the "−" turns which are wound in the counterclockwise direction). Consequently, the counterpropagating light beams travel through different path lengths, which results in a phase difference between the light beams. This phase difference is defined herein as an error because it is not related to rotation of the rotation sensor.

The time varying temperature gradient can be given by the following equation:

$$\frac{\Delta T_{ax}}{\Delta t} = \frac{\Delta T_{31}}{\Delta t} - \frac{\Delta T_{32}}{\Delta t} \quad (1)$$

where $\Delta T_{31}/\Delta t$ is the rate of temperature change at end 31 of the coil, $\Delta T_{32}/\Delta t$ is the rate of temperature change at end 32 of the coil, and $\Delta T_{ax}/\Delta t$ is the axial difference between the rates of temperature change at the two ends of the coil. The difference d in the rates of temperature change between corresponding turns of the "+" and "−" layers (which are separated by distance 27) is $\Delta T_{ax}/\Delta t$ divided by the number of turns in a layer. Although this difference d is quite small, the effect of this small difference accumulates over an entire coil half and becomes relatively large. The accumulation of this effect over the entire coil produces a phase difference between the counterpropagating beams which will result in a relatively large false indication of rotation.

Figure 2:
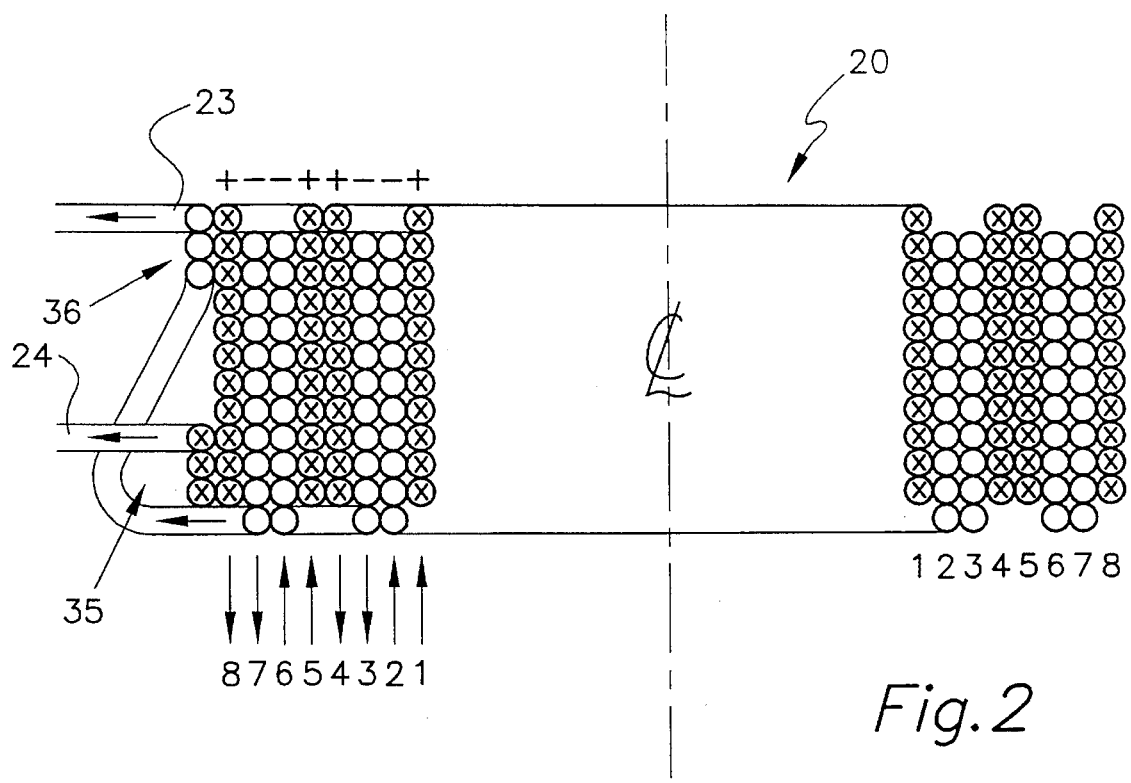
FIG. 2 shows an arrangement employing trimming lengths of the fiber ends for substantially eliminating axial errors with respect to two quadrupoles wound in a +—−+ +—−+ winding configuration.

One manner of reducing this axial time varying temperature gradient dependent error is to axially displace trimming lengths of the first and second ends of the fiber from one another. For example, as shown in FIG. 2, after layer 8 has been wound with the "+" end of the fiber, a first trimming length of the "+" end of the fiber is wound around the outside perimeter of coil 20 by a number of trimming turns 35. Similarly, a second trimming length of the "−" end of the fiber is wound around the outside perimeter by a number of trimming turns 36. The trimming turns 35 and 36 are axially, but not radially, displaced from one another. The number of trimming turns 35 and 36 as well as the amount of displacement between trimming turns 35 and 36 can be selected to minimize the error resulting from the axial time varying temperature gradient experienced by the coil 20. Specifically, light beams can be injected into extremities 23 and 24 with coil 20 mounted on a stationary, stable platform and an axial time varying temperature gradient can be applied to the coil. The counterpropagating light beams exiting extremities 23 and 24 can be combined and the phase difference sensed. Trimming turns 35 and 36 can then be wound until the error, which results from an axial time varying temperature gradient acting on the spatial displacement of the two halves of the coil, is minimized.

Figure 3:
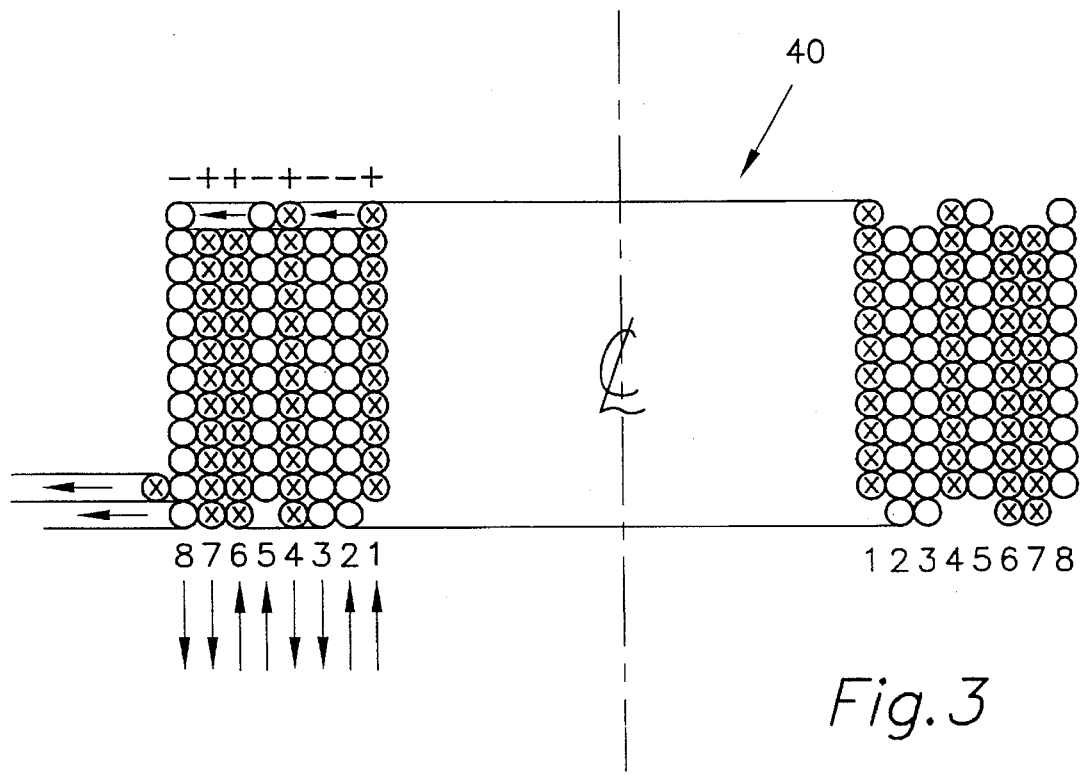
FIG. 3 shows a reverse quadrupole (i.e. an octupole) fiber optic coil arrangement.

Alternatively, axial time varying temperature gradient dependent errors can be materially reduced if the coil 40 as shown in FIG. 3 is wound using reversed quadrupoles (i.e. an octupole). That is, the quadrupole comprising layers 1–4 is wound with a +−−+ layer configuration whereas the second quadrupole comprising layers 5–8 is wound with a −++− layer configuration. Specifically, the "+" end of the optical fiber, starting near the middle A/B of the fiber E, is used to wind layer 1, the "−" end is used to wind layers 2 and 3, and the "+" end is used to wind layer 4, the "−" end is used to wind layer 5, the "+" end is use to wind layers 6 and 7, and the "−" end is used to wind layer 8. Layers 1, 4, 6 and 7 may be wound in the clockwise direction and layers 2, 3, 5 and 8 may be wound in the counterclockwise direction. This reversed quadrupole arrangement is defined herein as an octupole.

It can be seen that the spatial axial offset with respect to the "+" and "−" layers of the first quadrupole (layers 1–4) is reversed with respect to the "+" and "−" layers of the second quadrupole (layers 5–8). The sensitivity to axial time varying temperature gradients is reduced because the spatial asymmetry with respect to the "+" and "−" halves of the coils shown in FIGS. 1 and 2 is eliminated. Thus, although the error resulting from an axially oriented time varying temperature gradient has not been eliminated, it has been materially reduced and in many cases is tolerable. Moreover, error resulting from a radially oriented time varying temperature gradient is substantially eliminated.

Figure 4:
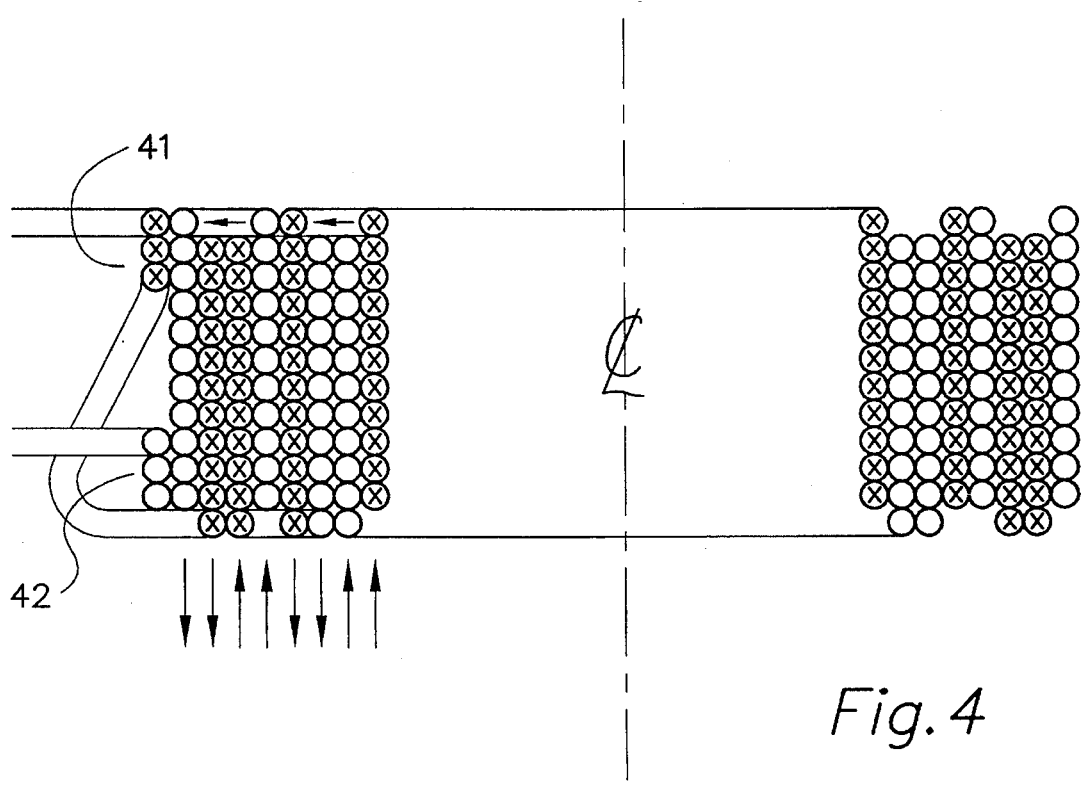
FIG. 4 shows an arrangement employing trimming lengths of the fiber ends for substantially eliminating axial errors with respect to two quadrupoles wound in a +—−+ −++− winding configuration.
Figure 5:
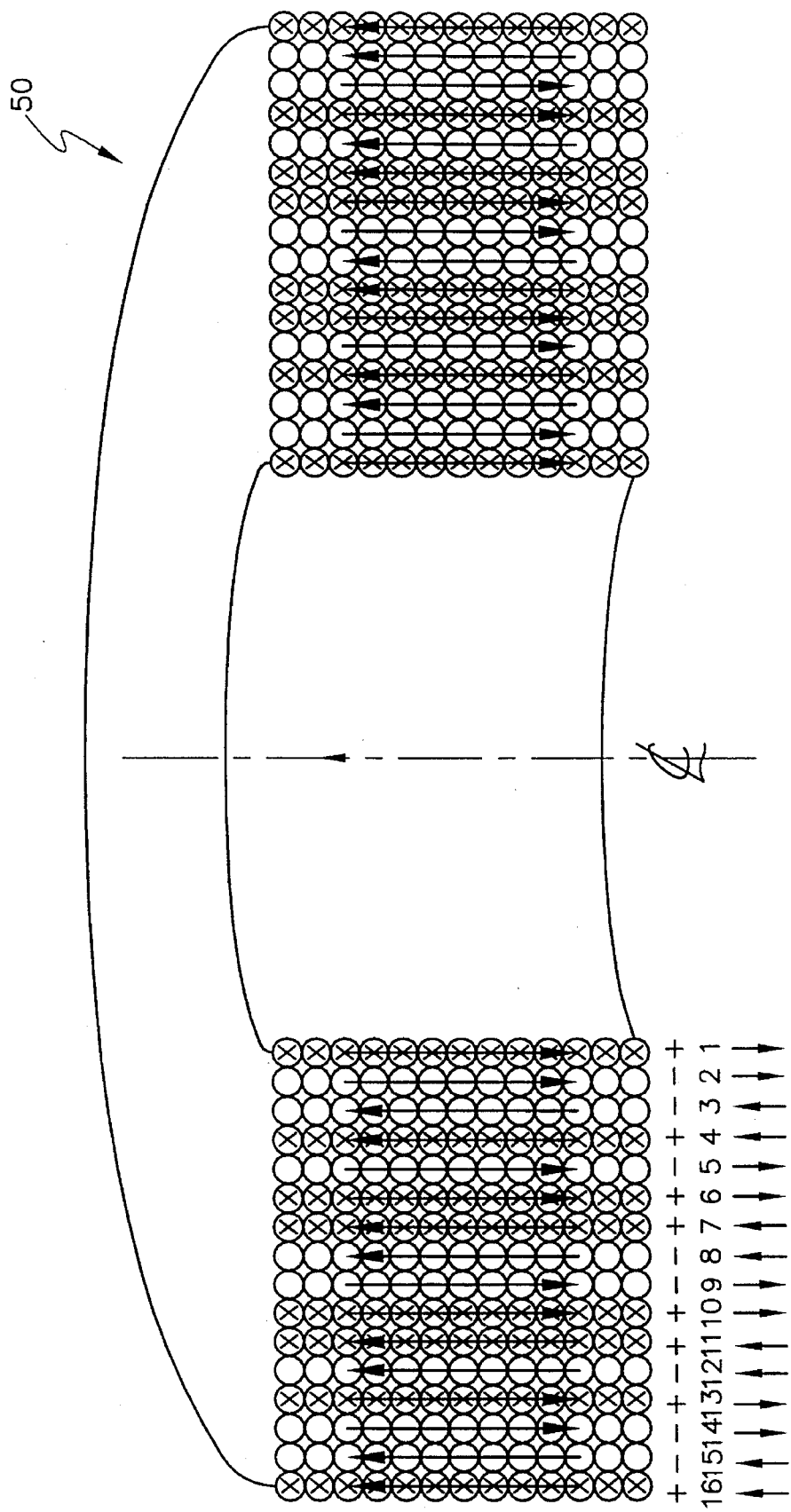
FIG. 5 shows a sixteen layer reverse octupole device which substantially eliminates axial and radial errors.

This reduced error resulting from an axially oriented time varying temperature gradient can be substantially eliminated either by adding the trimming turns 41 and 42 as shown in FIG. 4 to the octupole shown in FIG. 3 or by providing a pair of reversed octupoles as shown in FIG. 5.

In FIG. 5, coil 50 is comprised of a quadrupole including layers 1–4 having a +−−+ layer configuration and a quadrupole comprising layers 5–8 having a reverse layer configuration, i.e. −++−. Thus, layers 1–8 form an octupole comprised of two reversely wound quadrupoles. Axially dependent time varying temperature errors can be substantially eliminated by adding a second reverse octupole comprising layers 9–16. This second octupole has a quadrupole comprising layers 9–12 wound with a −++− layer configuration and a quadrupole comprising layers 13–16 wound with a +−−+ layer configuration.

Accordingly, layer 1 is wound clockwise, in this case beginning at the top of coil 50, with the "+" end of an optical fiber. Layers 2 and 3 are wound counterclockwise in the direction of the arrows from the "−" end. The fourth layer is wound clockwise from the "+" end of the fiber in the direction of the arrow, the fifth layer is wound counterclockwise from the "−" end of fiber in the direction of the arrow and layers 6 and 7 are wound clockwise from the "+" end of the fiber in the direction of the arrows. The eighth and ninth layers are wound counterclockwise from the "−" end of the fiber in the direction of the arrows, and so on. By reversing the octupoles, the error resulting from the axially applied time varying temperature gradient is substantially eliminated.

This sixteen layer reverse octupole arrangement likewise substantially eliminates radial time varying temperature gradient dependent errors since it is simply two octupolar layers back-to-back, i.e. reversed octupolar layers. However, the reversed octupolar arrangement improves on the axial symmetry and substantially eliminates axial time varying temperature gradient dependent errors.

Varying thermal gradient dependent errors in indicated rotation rate from an Interferometric Fiber Optic Gyro (IFOG) can be described with the following equation:

$$\Omega_e = \frac{nN\pi}{L^2} \frac{\Delta n}{\Delta T} \int_0^L \frac{\Delta T(l)}{\Delta t} (2l - L) dl \quad (2)$$

where "$\Omega_e$" is the erroneously indicated rotation rate, "n" is the index of refraction of the optical fiber, "N" is the total number of turns in the fiber optic sensing loop, "L" is the total length of the fiber optic sensing loop wherein the length of the fiber optic sensing loop includes the length of the fiber optic coil and the length of the optical leads between the beam splitter and the fiber optic coil, "$\Delta n/\Delta T$" is the thermal coefficient of "n", "l" is a variable indicating position along the fiber optic sensing loop, and "$\Delta T(l)/\Delta t$" is the function describing the rate of change of temperature over the length of the fiber optic sensing loop. Transforming equation (2) to a layer-by-layer summation and neglecting the typically short fiber optic leads that join the fiber optic coil to the beam splitter results in the following equation:

$$\Omega_e = \frac{nN\pi}{L^2} \frac{\Delta n}{\Delta T} \sum_{i=1}^m \int_{l_1(i)}^{l_2(i)} \frac{\Delta T(i)}{\Delta t} (2l - L) dl \quad (3)$$

where "i" is a variable indicating layer number, "m" is the number of layers in the fiber optic coil, "$l_1(i)$" is the length from the start of the fiber optic coil to the beginning of layer "i", "$l_2(i)$" is the length from the start of the fiber optic coil to the end of layer "i", and "$\Delta T(i)/\Delta t$" is the function describing the rate of temperature change of layer "i". The factors $l_1(i)$ and $l_2(i)$ can be given by the following equations:

$$l_1(i) = \frac{L}{m}(i-1) \quad (4)$$

and $$l_2(i) = \frac{L}{m} i \quad (5)$$

(It may be noted that these equations define equal lengths of fiber in each layer. In practice, this is a sufficiently accurate assumption and more easily illustrates the benefits of this invention.)

Performing the integration of equation (3) results in the following equation:

$$\Omega_e = \frac{nN\pi}{m^2} \frac{\Delta n}{\Delta T} \sum_{i=1}^{m} \frac{\Delta T(i)}{\Delta t}(2i - m - 1) \quad (6)$$

The first factor after the summation sign in equation (6) describes the changing temperature as a function of layer and the second parenthetical factor in equation (6) describes the weighting factor given each layer which is dependent on its position from the beginning of the coil.

The table shown in FIG. 6 gives an example of equation (6) and, therefore, of the canceling effect with regard to axial time varying temperature gradient effects in a sixteen layer device such as the one shown in FIG. 5. FIG. 6 schematically shows, along side the first column of numbers, the position along the length of the fiber of each layer within the coil. It should be noted that the layers shown in FIG. 6 have been assigned layer numbers which are different than the layer numbers shown in FIG. 5. The layer numbers of FIG. 6 show the position of each layer along the fiber length as seen by one of the light beams propagating therethrough. Thus, layer 1 shown in FIG. 6 corresponds to the outermost layer 16 shown in FIG. 5, layer 16 shown in FIG. 6 corresponds to the next outermost layer 15 shown in FIG. 5, and so on.

The first column of numbers in FIG. 6 contains the layer numbers for the sixteen layers of a coil wound in a —++—+ —++—+—++— configuration. The second column contains weighting factors which depend upon the length of the fiber from the middle A/B of the fiber to the midpoint of the fiber in its respective layer and has a polarity corresponding to which end of the fiber is used to wind that corresponding layer. The third column shows temperature dependent factors, i.e. those factors in equation (6) dependent upon an axially applied time varying temperature gradient.

The fourth column of numbers in FIG. 6 represents the axial time varying temperature gradient dependent error of each layer and results from multiplying the values in the second column by the corresponding value in the third column. The fifth column represents the accumulated error for each quadrupole of the layers shown at the left-hand side of FIG. 6. The last column of FIG. 6 shows the accumulated octupolar errors for each octupole.

As can be seen from FIG. 6, each quadrupole has a fairly sizable error as a result of the axial time varying temperature gradient which is applied to the sixteen layer coil. These errors will all be positive and will accumulate in a standard +—++—+ configuration. However, the net octupolar error resulting from a first quadrupole having a +—+ configuration and a reversed quadrupole having a —++— configuration reduces the error dramatically. This error can be substantially eliminated by using a reversed octupole as shown by the lower eight layers of FIG. 6. Accordingly, the first octupole gives an accumulated axial time varying temperature gradient dependent error of +8 while the second eight layers of the coil produce an accumulated time varying temperature gradient dependent error of −8. Because of the way in which the layers are wound with the —++—+—++— —+—++— layer configuration, these octupolar errors cancel one another out leaving a substantially zero axial time varying temperature gradient dependent error.

FIG. 7 is a table showing representative values with respect to a radial time varying temperature gradient applied to a coil such as the coil of FIG. 5. Because the time varying temperature gradient is applied radially, the temperature factors in the third column will change linearly with regard to each layer. The fourth column of FIG. 7 shows the error of each layer whereas the fifth column shows the accumulated error for each quadrupole and the last column shows the accumulated error for each octupolar portion of the coil. As can be seen, only an eight layer coil is needed to substantially eliminate radial time varying temperature gradient dependent errors.

Accordingly, the present invention substantially eliminates errors due to both axial time varying temperature gradients and radial time varying temperature gradients. Thus, the need for a temperature stable environment for the fiber optic coil arrangement has been materially reduced.

The "+" and "−" symbols have been used to denote the difference between a layer wound from one end of the optical fiber and a layer wound from the other end of the optical fiber. Thus, in an octupolar winding arrangement, the first quadrupole can be wound with a +——+ layer configuration and the second quadrupole can be wound with a —++— layer configuration or the first quadrupole can be wound with a —++— layer configuration and the second quadrupole can be wound with a +——+ layer configuration. Furthermore, the a sixteen layer arrangement may have a +——+—++——++ —+——+ layer configuration or a —++—+——++—+—++— layer configuration.

Figure 9:
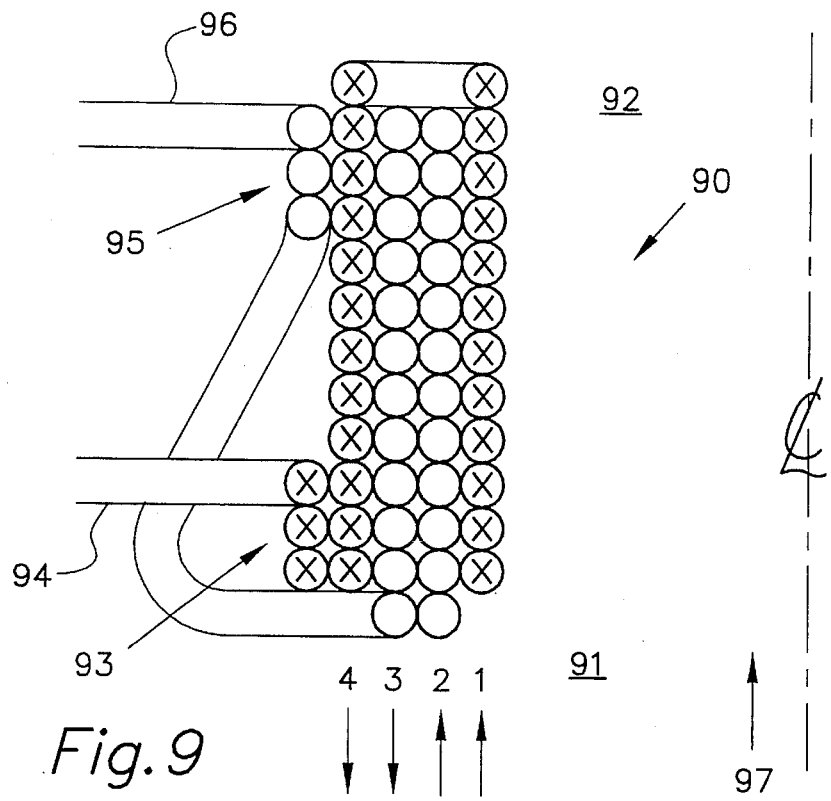
FIG. 9 shows an arrangement employing trimming lengths of the fiber ends for substantially eliminating axial errors with respect to a single quadrupole.

The trimming turns as shown in FIGS. 2 and 4 can be used with a single quadrupole coil as shown in FIG. 9 in order to compensate for errors resulting from a time varying temperature gradient applied in the axial direction 97. Coil 90 comprises a single quadrupole having layers 1, 2, 3, and 4 each having a plurality of turns. Layer 1 is wound with a first half (or end) of an optical fiber from end 91 of coil 90 to end 92. Layer 2 is wound with a second half (or end) of the optical fiber from end 91 of coil 90 to end 92. Layer 3 is wound from end 92 of coil 90 to end 91 by continued use of the second half (or end) of the optical fiber. Layer 4 is wound from end 92 of coil 90 to end 91 by continued use of the first half (or end) of the optical fiber.

After layer 4 is wound, the first half (or end) of the optical fiber is used to wind trimming turns 93 around the outer perimeter of coil 90 and is then brought out as extension 94 in order to receive a first light beam and to output a second light beam. After layer 4 is wound, the second half (or end) of the optical fiber is used to wind trimming turns 95 also around the outer perimeter of coil 90 and is then brought out as extension 96 in order to receive the second light beam and to output the first light beam. As seen in FIG. 9, trimming turns 93 and 95 are spatially offset from one another in the axial direction but not in the radial direction. Thus, the number of trimming turns 93 and 95 as well as the amount of spatial offset can be selected in order to compensate for (i.e. reduce) errors resulting from an axially applied time varying temperature gradient. Accordingly, light beams can be injected into extensions 94 and 96 with coil 90 mounted on a stationary, stable platform and an axial time varying temperature gradient can be applied to the coil. The counterpropagating light beams exiting extensions 94 and 96 can be combined and the phase difference sensed. Trimming turns 93 and 95 can then be wound until the error, which results from an axial time varying temperature gradient acting on the spatial displacement of the two halves of the coil 90, is minimized.

Figure 10:
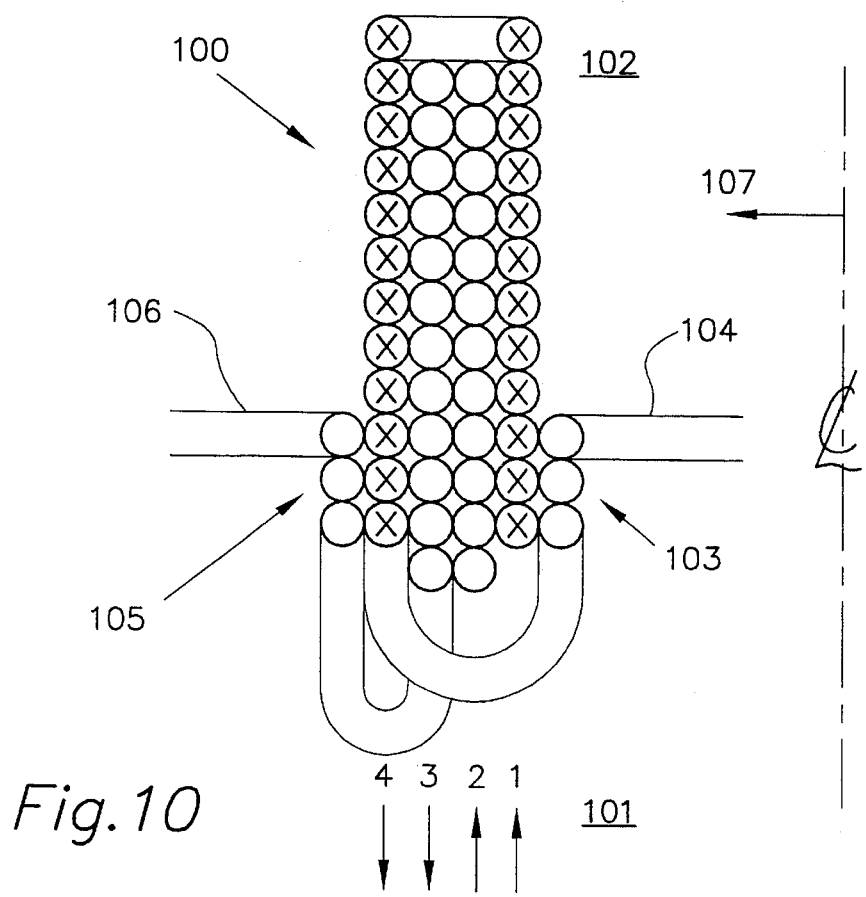
FIG. 10 shows an arrangement employing trimming lengths of the fiber ends for substantially eliminating radial errors with respect to a single quadrupole.

As shown in FIG. 10, trimming turns can also be used to compensate for errors resulting from a time varying temperature gradient applied in the radial direction 107. Coil 100 again comprises a single quadrupole having layers 1, 2, 3, and 4 each having a plurality of turns. Layer 1 is wound with a first half (or end) of an optical fiber from end 101 of coil 100 to end 102. Layer 2 is wound with a second half (or end) of the optical fiber from end 101 of coil 100 to end 102. Layer 3 is wound from end 102 of coil 100 to end 101 by continued use of the second half (or end) of the optical fiber. Layer 4 is wound from end 102 of coil 100 to end 101 by continued use of the first half (or end) of the optical fiber.

After layer 4 (i.e. the outermost layer) is wound, the first half (or end) of the optical fiber is used to wind trimming turns 103 along the inner perimeter of coil 100 and is then brought out as extension 104 in order to receive a first light beam and to output a second light beam. After layer 4 is wound, the second half (or end) of the optical fiber is used to wind trimming turns 105 around the outer perimeter of coil 100 and is then brought out as extension 106 in order to receive the second light beam and to output the first light beam. As seen in FIG. 10, trimming turns 103 and 105 are spatially offset from one another in the radial direction but not in the axial direction. Thus, the number of trimming turns 103 and 105 can be selected in order to compensate for (i.e. reduce) errors resulting from a radially applied time varying temperature gradient. Accordingly, light beams can be injected into extensions 104 and 106 with coil 100 mounted on a stationary, stable platform and a radial time varying temperature gradient can be applied to the coil. The counterpropagating light beams exiting extensions 104 and 106 can be combined and the phase difference sensed. Trimming turns 103 and 105 can then be wound until the error, which results from a radial time varying temperature gradient acting on the optical fiber layers, is minimized.

Figure 11:
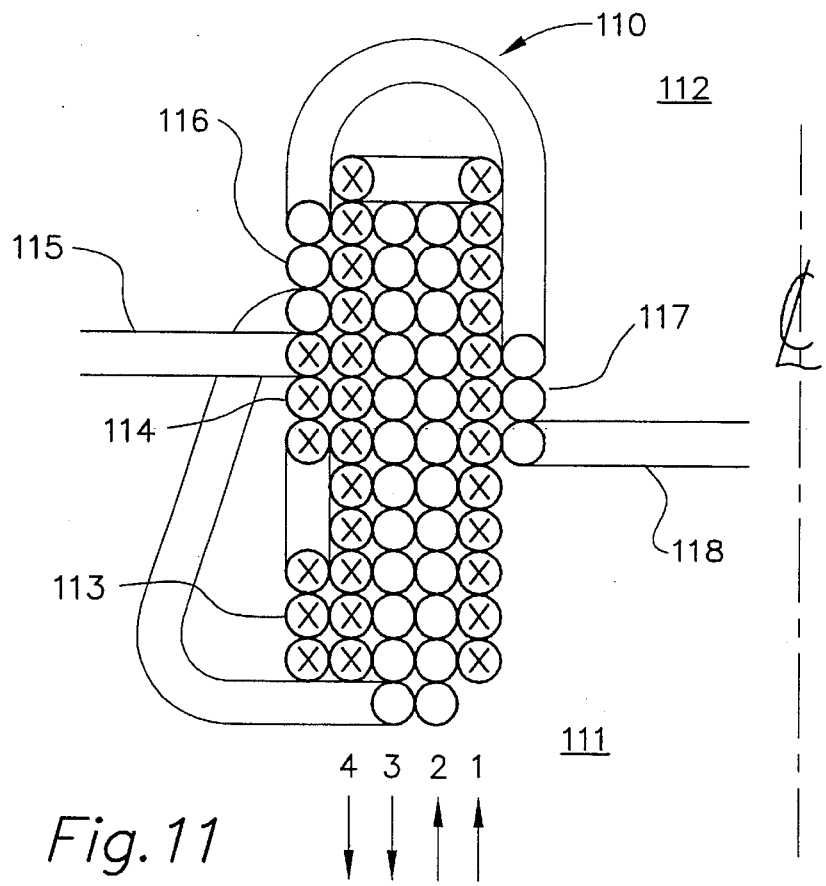
FIG. 11 shows an arrangement employing trimming lengths of the fiber ends for substantially eliminating axial and radial errors with respect to a single quadrupole; and, FIG. 12 shows an arrangement similar to the arrangement shown if FIG. 11 but where some of the trimming turns have been eliminated to produce a minimum coil configuration while at the same time substantially reducing axial and/or radial errors.

As shown in FIG. 11, trimming turns can be used to compensate for errors resulting from both a time varying temperature gradient applied in the radial direction and a time varying temperature gradient applied in the axial direction. Coil 110 again comprises a single quadrupole having layers 1, 2, 3, and 4 each having a plurality of turns. Layer 1 is wound with a first half (or end) of an optical fiber from end 111 of coil 110 to end 112. Layer 2 is wound with a second half (or end) of the optical fiber from end 111 of coil 110 to end 112. Layer 3 is wound from end 112 of coil 110 to end 111 by continued use of the second half (or end) of the optical fiber. Layer 4 is wound from end 112 of coil 110 to end 111 by continued use of the first half (or end) of the optical fiber.

After layer 4 (i.e. the outermost layer) is wound, the first half (or end) of the optical fiber is used to wind both trimming turns 113 along the outer perimeter of coil 110 and trimming turns 114 also along the outer perimeter of coil 110 before being brought out as extension 115 in order to receive a first light beam and to output a second light beam. After layer 4 is wound, the second half (or end) of the optical fiber is used to wind both trimming turns 116 around the outer perimeter of coil 110 and trimming turns 117 around the inner perimeter of coil 110 before being brought out as extension 118 in order to receive the second light beam and to output the first light beam.

As seen in FIG. 11, trimming turns 113 and 116 are spatially offset from one another in the axial direction but not in the radial direction whereas trimming turns 114 and 117 are spatially offset from one another in the radial direction but not in the axial direction. Thus, the number of trimming turns 113 and 116 as well as the amount of spatial offset can be selected in order to compensate for (i.e. reduce) errors resulting from an axially applied time varying temperature gradient, and the number of trimming turns 114 and 117 can be selected in order to compensate for (i.e. reduce) errors resulting from an radially applied time varying temperature gradient.

Accordingly, light beams can be injected into extensions 115 and 118 with coil 110 mounted on a stationary, stable platform and a radial time varying temperature gradient can be applied to the coil. The counterpropagating light beams exiting extensions 115 and 118 can be combined and the phase difference sensed. A time varying temperature gradient is applied in the axial direction and trimming turns 113 and 116 can then be wound until the error, which results from an axial time varying temperature gradient acting on the spatial displacement of the two halves of the coil 90, is minimized. Then, a time varying temperature gradient is applied in the radial direction and trimming turns 114 and 117 can then be wound until the error, which results from a radial time varying temperature gradient acting on the optical fiber layers, is minimized.

Some of the trimming turns shown in FIG. 11 can be eliminated if desired. As viewed in FIG. 11, if the turns 114 and 117 are wound in the same axial position as the turns 116, e.g. near the top of the coil, then any effects on the propagation of light through the turns 116 and on the propagation of light through the turns 114 are the same, and there is no net effect. Therefore, the same reduction in error is realized as long as an equal number of turns are removed from the turns 114 and 116. Such an arrangement is shown in FIG. 12.

Figure 12:
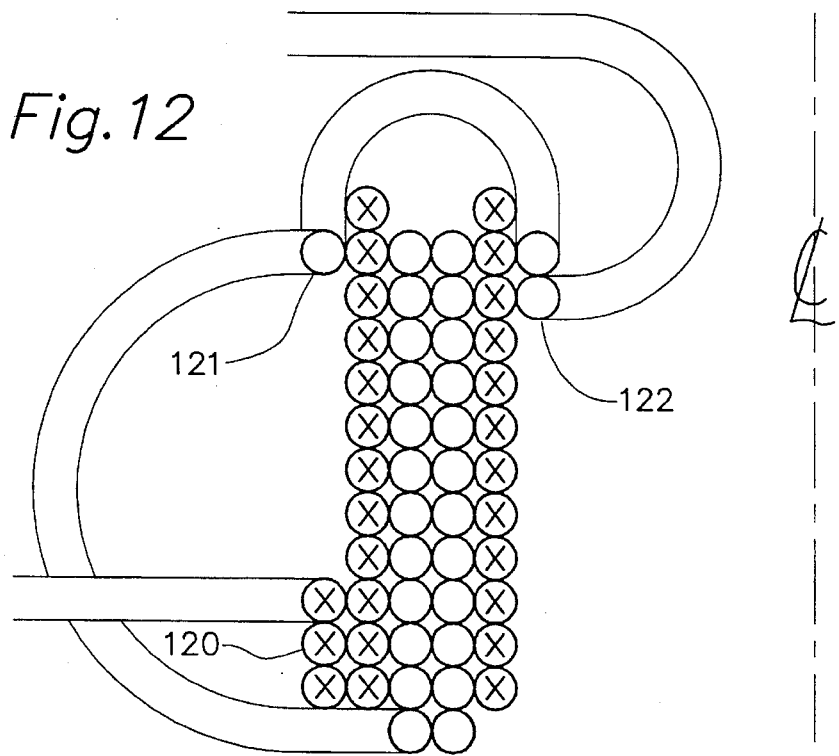

As seen in FIG. 12, trimming turns 120 are spatially offset from trimming turns 121 and 122 in the axial direction and trimming turns 121 and 122 are spatially offset from one another in the radial direction. By comparing FIGS. 11 and 12, it can be seen that two turns of the trimming turns 116 have been eliminated and both turns of the trimming turns 114 have been eliminated. Yet the coil shown in FIG. 12 achieves the same reduction in error as is achieved by the coil shown in FIG. 11.

Modifications to the invention may be made without departing from the scope of the present invention. For example, the trimming turns as disclosed herein have been applied to reduce error caused by axial and/or radial varying temperature gradients; however, these trimming turns can be used to reduce errors produced by causes other than axial and/or radial varying temperature gradients, such as errors resulting from axial and/or radial winding inconsistencies. Furthermore, although the trimming turns, such as the trimming turns 113 and 116 shown in FIG. 11, for reducing axial errors have been shown wound about or near the outside diameter of the coil, these trimming turns could alternatively be wound at or near the top and bottom of the coil or about or near the inside diameter of the coil. Moreover, although the trimming turns, such as the trimming turns 114 and 117 shown in FIG. 11, for reducing radial errors have been shown wound about or near the outside and inside diameters of the coil, these trimming turns could alternatively be wound at or near the top of the coil or at or near the bottom of the coil. If these trimming turns are wound at or near the top of the coil or are wound at or near the bottom of the coil, the spatial offset between the trimming turns can be adjusted to further influence the radial error. Therefore, while this invention has been described in its preferred embodiments, its scope is not limited thereto. Rather, it is limited only insofar as defined in the following set of claims.

We claim:

1. A method of winding a fiber optic coil assembly comprising the steps of:

winding a fiber optic coil having s segments, wherein each of the s segments has a pattern of layers of turns, wherein a first portion of the layers of turns in the segment includes consecutive turns formed into at least one layer which is wound predominantly from one of first and second ends of an optical fiber, wherein a second portion of the layers of turns in the segment includes consecutive turns formed into at least one layer which is wound predominantly from one end of the first and second ends of the optical fiber, wherein the second portion of the layers of turns is wound around the first portion of the layers of turns, wherein a third portion of the layers of turns in the segment includes consecutive turns formed into at least one layer which is wound predominantly from one of the first and second ends of the optical fiber, wherein the third portion of the layers of turns is wound around the second portion of the layers of turns, wherein a fourth portion of the layers of turns in the segment includes consecutive turns formed into at least one layer which is wound predominantly from one of the first and second ends of the optical fiber, wherein the fourth portion of the layers of turns is wound around the third portion of the layers of turns, and wherein s is a number; and, winding a first number of trimming turns from a first end of the optical fiber and a second number of trimming turns from the second end of the optical fiber on the s segments, wherein the first and second number of trimming turns are spatially offset from one another and are arranged so that error between phases of light counter-propagating through the fiber optic coil is reduced from what the error would have been without the trimming turns, and wherein the first and second numbers of trimming turns, when added together, are fewer than the turns in any of the s segments.

2. The method of claim 1 wherein the fiber optic coil has an outside perimeter and an inside perimeter, and wherein the step of winding the first and second numbers of trimming turns comprises the step of winding both the first and second numbers of trimming turns at one of the outside and inside perimeters so that the first and second numbers of trimming turns are spatially offset from each other in an axial direction whereby axial related error between phases of light counter-propagating through the fiber optic coil is reduced.

3. The method of claim 1 wherein the fiber optic coil has an outside perimeter and an inside perimeter, and wherein the step of winding the first and second numbers of trimming turns comprises the steps of winding the first number of trimming turns at the outside perimeter and winding the second number of trimming turns at the inside perimeter, whereby radial related error between phases of light counter-propagating through the fiber optic coil is reduced.

4. The method of claim 1 wherein the first portion of the layers of a first s section is wound from the first end of the optical fiber, wherein the second portion of the layers of the first s section is wound from a second end of the optical fiber, wherein the third portion of the layers of the first s section is wound from the second end of the optical fiber, wherein the fourth portion of the layers of the first s section is wound from the first end of the optical fiber, wherein a second s section is adjacent to the first s section, wherein the first portion of the layers of the second s section is wound from the first end of the optical fiber, wherein the second portion of the layers of the second s section is wound from the second end of the optical fiber, wherein the third portion of the layers of the second s section is wound from the second end of the optical fiber, and wherein the fourth portion of the layers of the second s section is wound from the first end of the optical fiber.

5. The method of claim 4 wherein the fiber optic coil has an outside perimeter and an inside perimeter, and wherein the step of winding the first and second numbers of trimming turns comprises the step of winding both the first and second numbers of trimming turns at one of the outside and inside perimeters so that the first and second numbers of trimming turns are spatially offset from each other in an axial direction whereby axial related error between phases of light counter-propagating through the fiber optic coil is reduced.

6. The method of claim 4 wherein the fiber optic coil has an outside perimeter and an inside perimeter, and wherein the step of winding the first and second numbers of trimming turns comprises the steps of winding the first number of trimming turns at the outside perimeter and winding the second number of trimming turns at the inside perimeter, whereby radial related error between phases of light counter-propagating through the fiber optic coil is reduced.

7. The method of claim 1 wherein first portion of the layers of a first s section is wound from the first end of the optical fiber, wherein the second portion of the four layers of the first s section is wound from the second end of the optical fiber, wherein the third portion of the layers of the first s section is wound from the second of the optical fiber, wherein the fourth portion of the layers of the first s section is wound from the first end of the optical fiber, wherein a second s section is adjacent to the first s section, wherein the first portion of the layers of the second s section is wound from the second end of the optical fiber, wherein the second portion of the layers of the second s section is wound from the first end of the optical fiber, wherein the third portion of the layers of the second s section is wound from the first end of the optical fiber, and wherein the fourth portion of the layers of the second s section is wound from the first end of the optical fiber.

8. The method of claim 7 wherein the fiber optic coil has an outside and an inside perimeter, and wherein the step of winding the first and second numbers of trimming turns comprises the step of winding both the first and second numbers of trimming turns at one of the outside and inside perimeters so that the first and second numbers of trimming turns are spatially offset from each other in an axial direction whereby axial related error between phases of light counter-propagating through the fiber optic coil is reduced.

9. The method of claim 7 wherein the fiber optic coil has an outside perimeter and an inside perimeter, and wherein the step of winding the first and second numbers of trimming turns comprises the steps of winding the first number of trimming turns at the outside perimeter and winding the second number of trimming turns at the inside perimeter, whereby radial related error between phases of light counter-propagating through the fiber optic coil is reduced.

10. A fiber optic coil assembly comprising:

a fiber optic coil having first and second axial ends, a plurality of layers wound between the first and second axial ends, and a midpoint A/B at one of the first and second axial ends, wherein the plurality of layers has a total of c turns of an optical fiber, wherein the optical fiber extends between a first extremity $E_1$ and a second $E_2$, wherein $c_1$ turns of the c turns are wound from the midpoint A/B with a first end of the optical fiber, wherein $c_2$ turns of the c turns are wound from the midpoint A/B with a second end of the optical fiber, wherein $c=c_1+c_2$, wherein $l_1$ is the length of the optical fiber between $E_1$ and the midpoint A/B and includes the $c_1$ turns, wherein $l_2$ is the length of the optical fiber between $E_2$ and the midpoint A/B and includes the $c_2$ turns; and, error reducing means for reducing error between phases of light counter-propagating around the fiber optic coil, wherein the error reducing means includes a trimming length of the first end of the optical fiber, and wherein the trimming length is equal to $l_1-l_2$.

11. The fiber optic coil assembly of claim 10 wherein the fiber optic coil is wound in a +—–+ predetermined pattern such that a first segment of layers are wound with the +—–+ predetermined pattern and such that additional segments of layers, if any, are wound so as to continue the same +—–+ predetermined pattern.

12. The fiber optic coil assembly of claim 11 wherein the optical fiber has first and second ends, wherein the +—–+ predetermined pattern has a first + portion, a first − portion, a second − portion, and a second + portion, wherein the first + portion is wound from the first end of the optical fiber into at least one layer of coil turns, wherein the first − portion is wound from the second end of the optical fiber into at least one layer of coil turns, wherein the second − portion is wound from the second end of the optical fiber into at least one layer of coil turns, and wherein the second + portion is wound from the first end of the optical fiber into at least one layer of coil turns.

13. The fiber optic coil assembly of claim 10 wherein the fiber optic coil is wound in a +—–+—++– predetermined pattern of layers such that a first segment of the layers are wound with the +—–+—++– predetermined pattern and such that additional segments, if any, are wound so as to continue the same +—–+—++– predetermined pattern.

14. The fiber optic coil assembly of claim 13 wherein the optical fiber has first and second ends, wherein the +—–+—++– predetermined pattern has a first + portion, a first − portion, a second − portion, a second + portion, a third − portion, a third − portion, a fourth + portion, and a fourth − portion, wherein the first + portion is wound from the first end of the optical fiber into at least one layer of coil turns, wherein the first − portion is wound from the second end of the optical fiber into at least one layer of coil turns, wherein the second − portion is wound from the second end of the optical fiber into at least one layer of coil turns, wherein the second + portion is wound from the first end of the optical fiber into at least one layer of coil turns, wherein the third − portion is wound from the second end of the optical fiber into at least one layer of coil turns, wherein the third + portion is wound from the first end of the optical fiber into at least one layer of coil turns, wherein the fourth + portion is wound from the first end of the optical fiber into at least one layer of coil turns, and wherein the fourth − portion is wound from the second end of the optical fiber into at least one layer of coil turns.

15. The fiber optic coil assembly of claim 10 wherein the predetermined pattern is +—–+—++–—++–+—–+ such that a first segment of the layers are wound with the +—–+—++–—++–+—–+ predetermined pattern and such that additional segments, if any, are wound so as to continue the same +—–+—++–—++–+—–+ predetermined pattern.

16. The fiber optic coil assembly of claim 15 wherein the optical fiber has first and second ends, wherein the +—–+—++–—++–+—–+ predetermined pattern has a first + portion, a first − portion, a second − portion, a second + portion, a third − portion, a third + portion, a fourth + portion, and a fourth − portion, a fifth − portion, a fifth + portion, a sixth + portion, a sixth − portion, a seventh + portion, a seventh − portion, an eighth − portion, and an eighth + portion, wherein the first + portion is wound from the first end of the optical fiber into at least one layer of coil turns, wherein the first − portion is wound from the second end of the optical fiber into at least one layer of coil turns, wherein the second − portion is wound from the second end of the optical fiber into at least one layer of coil turns, wherein the second + portion is wound from the first end of the optical fiber into at least one layer of coil turns, wherein the third − portion is wound from the second end of the optical fiber into at least one layer of coil turns, wherein the third + portion is wound from the first end of the optical fiber into at least one layer of coil turns, wherein the fourth + portion is wound from the first end of the optical fiber into at least one layer of coil turns, wherein the fourth − portion is wound from the second end of the optical fiber into at least one layer of coil turns, wherein the fifth − portion is wound from the second end of the optical fiber into at least one layer of coil turns, wherein the fifth + portion is wound from the first end of the optical fiber into at least one layer of coil turns, wherein the sixth + portion is wound from the first end of the optical fiber into at least one layer of coil turns, wherein the sixth − portion is wound from the second end of the optical fiber into at least one layer of coil turns, wherein the seventh + portion is wound from the first end of the optical fiber into at least one layer of coil turns, wherein the seventh − portion is wound from the second end of the optical fiber into at least one layer of coil turns, wherein the eighth − portion is wound from the second end of the optical fiber into at least one layer of coil turns, and wherein the eighth + portion is wound from the first end of the optical fiber into at least one layer of coil turns.

17. A method of winding a fiber optic coil assembly comprising the steps of:

winding a fiber optic coil having s segments, wherein each of the s segments has a pattern of n layers of turns, wherein s is a number, wherein n is a number greater than one, wherein at least one of the n layers of turns is wound predominantly from a first end of an optical fiber, and wherein at least a second of the n layers of turns is wound predominantly from a second end of the optical fiber; and, extending at least one of the first and second ends of the optical fiber as a trimming length so that error between phases of light counter-propagating through the fiber optic coil is reduced from what the error would have been without the trimming length, wherein the trimming length is in addition to the s segments, and wherein the trimming length is unequal in length to an s segment.

18. The method of claim 17 wherein the step of winding the fiber optic coil comprises the step of winding a first segment of the fiber optic coil in a +—–+ predetermined pattern of layers and winding additional segments, if any, in the same +—–+ predetermined pattern.

19. The method of claim 18 wherein the +—–+ pattern of the first segment of the fiber optic coil has a first + portion, a first − portion, a second − portion, and a second + portion, and wherein the step of winding the first segment of the fiber optic coil comprises the steps of winding the first + portion from the first end of the optical fiber into at least one layer of coil turns, winding the first − portion from the second end of the optical fiber into at least one layer of coil turns, winding the second portion − from the second end of the optical fiber into at least one layer of coil turns, and winding the second + portion from the first end of the optical fiber into at least one layer of coil turns.

20. The method of claim 17 wherein the step of winding the fiber optic coil comprises the step of winding a first segment of the fiber optic coil in a +−+−++− predetermined pattern of layers and winding additional segments, if any, in the same +−+−++− predetermined pattern.

21. The method of claim 20 wherein the +−+−++− pattern of the first segment of the fiber optic coil has a first + portion, a first − portion, a second − portion, a second + portion, a third − portion, a third + portion, a fourth + portion, and a fourth − portion, and wherein the step of winding the first segment of the fiber optic coil comprises the steps of winding the first + portion from the first end of the optical fiber into at least one layer of coil turns, winding the first − portion from the second end of the optical fiber into at least one layer of coil turns, winding the second − portion from the second end of the optical fiber into at least one layer of coil turns, winding the second + portion from the first end of the optical fiber into at least one layer of coil turns, winding the third − portion the second end of the optical fiber into at least one layer of coil turns, winding the third + portion from the first end of the optical fiber into at least one layer of coil turns, winding the fourth + portion from the first end of the optical fiber into at least one layer of coil turns, and winding the fourth − portion from the second end of the optical fiber into at least one layer of coil turns.

22. The method of claim 17 wherein the step of winding the fiber optic coil comprises the step of winding a first segment of the fiber optic coil in a +−+−++−++−+−+ predetermined pattern and winding additional segments, if any, in the same +−+−++−++−+−+ predetermined pattern.

23. The method of claim 22 wherein the +−+−++−++−+−+ pattern of the first segment of the fiber optic coil has a first + portion, a first − portion, a second − portion, a second + portion, a third − portion, a third + portion, a fourth + portion, and a fourth − portion, a fifth − portion, a fifth + portion, a sixth + portion, a sixth − portion, a seventh + portion, a seventh − portion, an eighth − portion, and an eighth + portion, and wherein the step of winding the first segment of the fiber optic coil comprises the steps of winding the first + portion from the first end of the optical fiber into at least one layer of coil turns, winding the first − portion from the second end of the optical fiber into at least one layer of coil turns, winding the second − portion from the second end of the optical fiber into at least one layer of coil turns, winding the second + portion from the first end of the optical fiber into at least one layer of coil turns, winding the third − portion from the second end of the optical fiber into at least one layer of coil turns, winding the third + portion from the first end of the optical fiber into at least one layer of coil turns, winding the fourth + portion from the first end of the optical fiber into at least one layer of coil turns, winding the fourth − portion from the second end of the optical fiber into at least one layer of coil turns, winding the fifth − portion from the second end of the optical fiber into at least one layer of coil turns, winding the fifth + portion from the first end of the optical fiber into at least one layer of coil turns, winding the sixth + portion from the first end of the optical fiber into at least one layer of coil turns, winding the sixth − portion from the second end of the optical fiber into at least one layer of coil turns, winding the seventh + portion from the first end of the optical fiber into at least one layer of coil turns, winding the seventh − portion from the second end of the optical fiber into at least one layer of coil turns, winding the eighth − portion from the second end of the optical fiber into at least one layer of coil turns, and winding the eighth + portion from the first end of the optical fiber into at least one layer of coil turns.

24. The method of claim 17 wherein n is the same number for each segment.

* * * * *

UNITED STATES PATENT AND TRADEMARK OFFICE
CERTIFICATE OF CORRECTION

PATENT NO.   : 5,506,923

DATED        : April 9, 1996

INVENTOR(S)  : Randy P. Goettsche and Ralph A. Bergh

It is certified that error appears in the above-identified patent and that said Letters Patent is hereby corrected as shown below:

Claim 10, column 13, line 4, before "$E_2$", add --extremity--;

Claim 14, column 13, line 45, change "- portion" to -- + portion--;

Claim 19, column 15, line 3, change "second portion -" to --second - portion--;

Signed and Sealed this

Twenty-seventh Day of August, 1996

BRUCE LEHMAN

Attest:

Attesting Officer             Commissioner of Patents and Trademarks

UNITED STATES PATENT AND TRADEMARK OFFICE
CERTIFICATE OF CORRECTION

PATENT NO. : 5,506,923
DATED : 04/09/96
INVENTOR(S) : Goettsche et al.

It is certified that error appears in the above-indentified patent and that said Letters Patent is hereby corrected as shown below:

Column 1, line 64, delete " +—+ " and replace with -- + - - + --.

Column 1, line 67, delete " +—+ " and replace with -- + - - + --.

Column 2, line 1, delete " +—+—+ " and replace with -- + - - + + - - + --.

Column 3, line 20, delete " +—+—+ " and replace with -- + - - + + - - + --.

Column 3, line 26, delete " +—+—++ " and replace with -- + - - + - + + - --.

Column 4, line 21, delete " +—+ " and replace with -- + - - + --.

Column 5, line 47, delete " +—+ " and replace with -- + - - + --.

Column 5, line 49, delete " -++- " and replace with -- - + + - --.

Column 6, line 10, delete " +—+ " and replace with -- + - - + --.

Column 6, line 12, delete " -++- " and replace with --  + + - --.

Column 6, line 17, delete " -++- " and replace with -- - + + - --.

UNITED STATES PATENT AND TRADEMARK OFFICE
CERTIFICATE OF CORRECTION

PATENT NO. : 5,506,923
DATED : 04/09/96
INVENTOR(S) : Goettsche et al.

It is certified that error appears in the above-identified patent and that said Letters Patent is hereby corrected as shown below:

Column 6, line 19, delete " +—+ " and replace with -- + - - + --.

Column 7, line 41, delete " ++—+—++—+—++ " and replace with -- - + + - + - - + + - - + - + + - --.

Column 7, line 62, delete " +—++—+ " and replace with -- + - - + + - - + --.

Column 7, line 63, delete " +—+ " and replace with -- + - - + --.

Column 7, line 64, delete " —++— " and replace with -- - + + - --.

Column 8, line 5, delete " ++—+—++—+—++ " and replace with -- - + + - + - - + + - - + - + + - --.

Column 8, line 30, delete " +—+ " and replace with -- + - - + --.

Column 8, line 31, delete " —++— " and replace with -- - + + - --.

Column 8, line 34, delete " —++— " and replace with -- - + + - --.

UNITED STATES PATENT AND TRADEMARK OFFICE
CERTIFICATE OF CORRECTION

PATENT NO. : 5,506,923
DATED : 04/09/96
INVENTOR(S) : Goettsche et al.

It is certified that error appears in the above-identified patent and that said Letters Patent is hereby corrected as shown below:

Column 8, line 35, delete " +—+ " and replace with -- + - - + --.

Column 8, line 36, delete " +—+—++—++—+—+ " and replace with -- + - - + - + + - - + + - + - - + --.

Column 8, line 37, delete " ++—+—++—+—++—+—+ " and replace with -- - + + - + - - + + - - + - + + - --.

IN THE CLAIMS:

Column 13,
Claim 11, line 2, delete " +—+ ", and replace with -- + - - + --.

Claim 11, line 3, delete " +—+ ", and replace with -- + - - + --.

Claim 11, line 5, delete " +—+ ", and replace with -- + - - + --.

Claim 12, line 2, delete " +—+ ", and replace with -- + - - + --.

Claim 13, line 2, delete " +—+—++ ", and replace with -- + - - + - + + - --.

UNITED STATES PATENT AND TRADEMARK OFFICE
CERTIFICATE OF CORRECTION

PATENT NO. : 5,506,923
DATED : 04/09/96
INVENTOR(S) : Goettsche et al.

It is certified that error appears in the above-identified patent and that said Letters Patent is hereby corrected as shown below:

Column 13,
Claim 13, line 4, delete " +—+—++ ", and replace with -- + - - + - + + - --.

Claim 13, line 6, delete " +—+—++ ", and replace with -- + - - + - + + - --.

Claim 14, lines 2&3, delete " +—+—++ ", and replace with -- + - - + - + + - --.

Claim 15, line 2, delete " +—+—++—++—+—+ " and replace with -- + - - + - + + - - + + - + - - + --.

Claim 15, lines 3&4, delete " +—+—++—++—+—+ " and replace with -- + - - + - + + - - + + - + - - + --.

Claim 15, line 6, delete " +—+—++—++—+—+ " and replace with -- + - - + - + + - - + + - + - - + --.
 Column 14,
Claim 16, line 2&3, delete " +—+—++—++—+—+ " and replace with + - - + - + + - - + + - + - - + --.

Claim 18, line 3, delete " +—+ " and replace with -- + - - + --.

UNITED STATES PATENT AND TRADEMARK OFFICE
CERTIFICATE OF CORRECTION

PATENT NO. : 5,506,923
DATED : 04/09/96
INVENTOR(S) : Goettsche et al.

It is certified that error appears in the above-indentified patent and that said Letters Patent is hereby corrected as shown below:

Claim 18, line 5, delete " +—+ " and replace with -- + - - + --.

Claim 19, line 1, delete " +—+ " and replace with -- + - - + --.
Column 15,
Claim 20, line 3, delete " +—+—++ " and replace with -- + - - + - ++ - --.

Claim 20, line 5, delete " +—+—++ " and replace with -- + - - + - ++ - --.

Claim 21, line 1, delete " +—+—++ " and replace with -- + - - + - ++ - --.

Claim 22, line 3, delete " +—+—++—++—+—+ " and replace with -- + - - + - ++ - - ++ - + - - + --.

Claim 22, line 6, delete " +—+—++—++—+—+ " and replace with -- + - - + - ++ - - ++ - + - - + --.

Claim 23, line 1&2, delete " +—+—++—++—+—+ " and replace with -- + - - + - ++ - - ++ - + - - + --.

Signed and Sealed this

Thirty-first Day of December, 1996

*Attest:*

BRUCE LEHMAN

*Attesting Officer*  *Commissioner of Patents and Trademarks*